US012627339B2

(12) United States Patent
Pehlke

(10) Patent No.: US 12,627,339 B2
(45) Date of Patent: May 12, 2026

(54) FRONT-END SYSTEMS BYPASSING TRANSMIT BAND FILTER FOR ANTENNA SWITCHING

(71) Applicant: Skyworks Solutions, Inc., Irvine, CA (US)

(72) Inventor: David Richard Pehlke, Westlake Village, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 117 days.

(21) Appl. No.: 18/240,804

(22) Filed: Aug. 31, 2023

(65) Prior Publication Data

US 2024/0097756 A1 Mar. 21, 2024

Related U.S. Application Data

(60) Provisional application No. 63/375,807, filed on Sep. 15, 2022.

(51) Int. Cl.
H04B 7/06 (2006.01)
H04B 1/16 (2006.01)
(52) U.S. Cl.
CPC ......... H04B 7/0602 (2013.01); H04B 1/1615 (2013.01)
(58) Field of Classification Search
CPC ......... H03L 7/091; H03L 7/087; H03L 7/093; H03L 7/095; H03L 2207/14; H03L 7/089; H04B 1/1615
See application file for complete search history.

(56) References Cited

U.S. PATENT DOCUMENTS

| | | |
|---|---|---|
| 9,548,522 B2 | 1/2017 | Whiefield et al. |
| 9,979,068 B2 | 5/2018 | Whitefield et al. |
| 10,103,772 B2 | 10/2018 | Pehlke et al. |
| 10,374,650 B2 | 8/2019 | Pehlke et al. |
| 11,245,552 B2 | 2/2022 | Brunel et al. |
| 11,271,602 B2 | 3/2022 | Domino et al. |
| 11,405,059 B2 | 8/2022 | Pehlke |
| 11,601,144 B2 | 3/2023 | Loh et al. |
| 11,601,247 B2 | 3/2023 | Brunel et al. |
| 11,646,757 B2 | 5/2023 | Pehlke |
| 11,652,504 B2 | 5/2023 | Thompson |
| 11,671,122 B2 | 6/2023 | Loh et al. |
| 11,716,100 B2 | 8/2023 | Pehlke |
| 11,736,140 B2 | 8/2023 | Pehlke et al. |
| 11,770,228 B2 | 9/2023 | Brunel et al. |

(Continued)

*Primary Examiner* — Curtis B Odom

(74) *Attorney, Agent, or Firm* — Knobbe, Martens, Olson & Bear, LLP

(57) ABSTRACT

Front-end systems with antenna switching that bypasses a transmit band filter are disclosed herein. In certain embodiments, a front-end architecture is based on switching the RF transmit signal behind or before the bandpass filter of the band. This enables the switch-combining and filter ganging used to support carrier aggregation and EN-DC connectivity to be maintained, and the SRS switching done this way for a target TDD band does not impact, interrupt, and/or otherwise re-route the partner bands. Accordingly, both an anchor carrier and a secondary carrier can be maintained without interruption or impact. Furthermore, carrier aggregation features can be maintained and is not interrupted by SRS.

20 Claims, 11 Drawing Sheets

(56)                     References Cited

U.S. PATENT DOCUMENTS

| 11,784,419 | B2 | 10/2023 | Pehlke et al. | |
| 11,799,502 | B2 | 10/2023 | Pehlke | |
| 11,855,663 | B2 | 12/2023 | Loh et al. | |
| 11,956,108 | B2 | 4/2024 | Drogi et al. | |
| 11,967,981 | B2 | 4/2024 | Raghavan | |
| 12,041,001 | B2 | 7/2024 | Jayaraman et al. | |
| 12,057,642 | B2 | 8/2024 | Pehlke et al. | |
| 12,057,879 | B2 | 8/2024 | Pehlke et al. | |
| 12,057,901 | B2 * | 8/2024 | See ..................... | H04B 1/0475 |
| 12,063,133 | B2 | 8/2024 | Drogi et al. | |
| 12,081,244 | B2 | 9/2024 | Pehlke | |
| 12,088,330 | B2 | 9/2024 | Loh et al. | |
| 12,166,510 | B2 | 12/2024 | Pehlke | |
| 2012/0171968 | A1 | 7/2012 | Poulin et al. | |
| 2016/0182119 | A1 * | 6/2016 | Handtmann ........... | H03H 9/706 |
| | | | | 375/220 |
| 2020/0036406 | A1 | 1/2020 | Pehlke et al. | |
| 2022/0407755 | A1 | 12/2022 | Drogi et al. | |
| 2023/0144780 | A1 | 5/2023 | Pehlke | |
| 2023/0155622 | A1 | 5/2023 | Raghavan et al. | |
| 2023/0239000 | A1 | 7/2023 | Thompson | |
| 2023/0275608 | A1 | 8/2023 | Pehlke | |
| 2023/0308119 | A1 | 9/2023 | Pehlke | |
| 2023/0344452 | A1 | 10/2023 | Loh et al. | |
| 2024/0030959 | A1 | 1/2024 | Pehlke | |
| 2024/0250761 | A1 | 7/2024 | Drogi et al. | |
| 2024/0259115 | A1 | 8/2024 | Drogi et al. | |
| 2024/0305315 | A1 | 9/2024 | Pehlke et al. | |
| 2024/0333462 | A1 | 10/2024 | Noel et al. | |
| 2024/0348280 | A1 | 10/2024 | Kankar et al. | |
| 2024/0348281 | A1 | 10/2024 | Pehlke et al. | |
| 2024/0356242 | A1 | 10/2024 | Pehlke et al. | |

* cited by examiner

10

2a

2b

2c

2g

1

3

2d

2e

2f mXn DL MIMO nXm UL MIMO

FRONT-END SYSTEMS BYPASSING TRANSMIT BAND FILTER FOR ANTENNA SWITCHING

CROSS-REFERENCE TO RELATED APPLICATIONS

This application claims the benefit of priority under 35 U.S.C. § 119 of U.S. Provisional Patent Application No. 63/375,807, filed Sep. 15, 2022 and titled "FRONT-END SYSTEMS BYPASSING TRANSMIT BAND FILTER FOR ANTENNA SWITCHING," which is herein incorporated by reference in its entirety.

BACKGROUND

Field

Embodiments of the invention relate to electronic systems, and in particular, to radio frequency electronics.

Description of Related Technology

Radio frequency (RF) communication systems can be used for transmitting and/or receiving signals of a wide range of frequencies. For example, an RF communication system can be used to wirelessly communicate RF signals in a frequency range of about 30 kHz to 300 GHz, such as in the range of about 400 MHz to about 7.125 GHz for Frequency Range 1 (FR1) of the Fifth Generation (5G) communication standard or in the range of about 24.250 GHz to about 71.000 GHz for Frequency Range 2 (FR2) of the 5G communication standard.

Examples of RF communication systems include, but are not limited to, mobile phones, tablets, base stations, network access points, customer-premises equipment (CPE), laptops, and wearable electronics.

SUMMARY

In certain embodiments, the present disclosure relates to a mobile device. The mobile device includes a plurality of antennas, and a front-end system coupled to the plurality of antennas. The front-end system includes a power amplifier configured to receive a radio frequency transmit signal at an input, a first amplifier selection switch connected to an output of the power amplifier, a first antenna switch, a transmit band filter connected between the first antenna switch and the first amplifier selection switch, a second amplifier selection switch connected to the first amplifier selection switch, a second antenna switch, and a receive band filter connected between the second antenna switch and the second amplifier selection switch.

In some embodiments, the plurality of antennas include a first antenna, a second antenna, a third antenna, and a fourth antenna. According to several embodiments, the radio frequency transmit signal is provided to the first antenna and the second antenna through the first amplifier selection switch and the first antenna switch. In accordance with various embodiments, the radio frequency transmit signal is provided to the third antenna and the fourth antenna through the first amplifier selection switch, the second amplifier selection switch, and the second antenna switch. According to various embodiments, the first antenna switch and the second antenna switch are each a cross-bar switch.

In several embodiments, the mobile device further includes a low noise amplifier connected to the receive filter through the second amplifier selection switch.

In various embodiments, the first amplifier selection switch and the second amplifier selection switch are connected by a cable that crosses between a first side of the mobile device and a second side of the mobile device.

In some embodiments, the front-end system is configured to provide sounding reference signaling by transmitting the radio frequency transmit signal on four or more antennas of the plurality of antennas. According to a several embodiments, the sounding reference signaling does not interrupt reception of an anchor carrier on the four or more antennas. In accordance with various embodiments, the radio frequency transmit signal is a fifth generation n41 signal and the anchor carrier is a long-term evolution B25 signal.

In several embodiments, the mobile device further includes a transceiver configured to generate the radio frequency transmit signal.

In certain embodiments, the present disclosure relates to a method of antenna switching in a mobile device. The method includes receiving a radio frequency transmit signal at an input of a power amplifier, providing the radio frequency transmit signal from an output of the power amplifier to a first amplifier selection switch, providing the radio frequency transmit signal from the first amplifier selection switch to a first antenna switch through a transmit band filter in a first mode, and providing the radio frequency transmit signal from the first amplifier selection switch to a second antenna switch through the second amplifier selection switch and a receive band filter in a second mode.

In various embodiments, the method further includes providing the radio frequency transmit signal to a first antenna and a second antenna through the first amplifier selection switch and the first antenna switch. According to a number of embodiments, the method further includes providing the radio frequency transmit signal to a third antenna and a fourth antenna through the first amplifier selection switch, the second amplifier selection switch, and the second antenna switch.

In certain embodiments, the present disclosure relates to a front-end system. The front-end system includes a power amplifier configured to receive a radio frequency transmit signal at an input, a first amplifier selection switch connected to an output of the power amplifier, and a second amplifier selection switch connected to the first amplifier selection switch, a first antenna switch and a second antenna switch, a transmit band filter connected between the first antenna switch and the first amplifier selection switch, and a receive band filter connected between the second antenna switch and the second amplifier selection switch.

In several embodiments, the radio frequency transmit signal is provided to a first antenna and a second antenna through the first amplifier selection switch and the first antenna switch. In accordance with some embodiments, the radio frequency transmit signal is provided to a third antenna and a fourth antenna through the first amplifier selection switch, the second amplifier selection switch, and the second antenna switch. According to a number of embodiments, the first antenna switch and the second antenna switch are each a cross-bar switch.

In various embodiments, the front-end system further includes a low noise amplifier connected to the receive filter through the second amplifier selection switch.

In some embodiments, the first amplifier selection switch and the second amplifier selection switch are connected by a cross-user equipment cable.

In several embodiments, the front-end system is configured to provide sounding reference signaling by transmitting the radio frequency transmit signal on four or more antennas.

In various embodiments, the sounding reference signaling does not interrupt reception of an anchor carrier on the four or more antennas. According to a number of embodiments, the radio frequency transmit signal is a fifth generation n41 signal and the anchor carrier is a long-term evolution B25 signal.

DETAILED DESCRIPTION OF EMBODIMENTS

Figure 1:
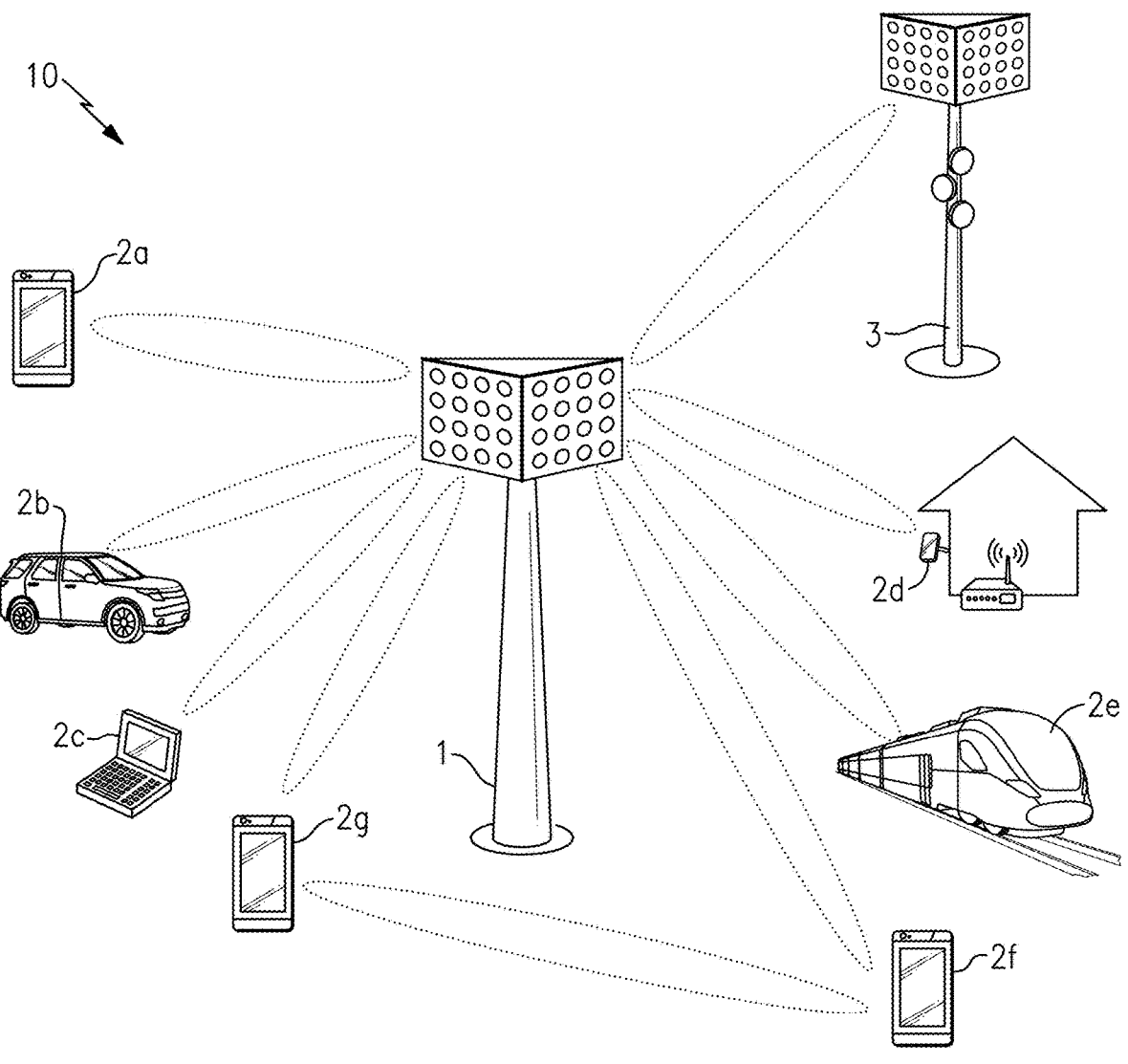
FIG. 1 is a schematic diagram of one example of a communication network.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The International Telecommunication Union (ITU) is a specialized agency of the United Nations (UN) responsible for global issues concerning information and communication technologies, including the shared global use of radio spectrum.

The 3rd Generation Partnership Project (3GPP) is a collaboration between groups of telecommunications standard bodies across the world, such as the Association of Radio Industries and Businesses (ARIB), the Telecommunications Technology Committee (TTC), the China Communications Standards Association (CCSA), the Alliance for Telecommunications Industry Solutions (ATIS), the Telecommunications Technology Association (TTA), the European Telecommunications Standards Institute (ETSI), and the Telecommunications Standards Development Society, India (TSDSI).

Working within the scope of the ITU, 3GPP develops and maintains technical specifications for a variety of mobile communication technologies, including, for example, second generation (2G) technology (for instance, Global System for Mobile Communications (GSM) and Enhanced Data Rates for GSM Evolution (EDGE)), third generation (3G) technology (for instance, Universal Mobile Telecommunications System (UMTS) and High Speed Packet Access (HSPA)), and fourth generation (4G) technology (for instance, Long Term Evolution (LTE) and LTE-Advanced).

The technical specifications controlled by 3GPP can be expanded and revised by specification releases, which can span multiple years and specify a breadth of new features and evolutions.

In one example, 3GPP introduced carrier aggregation (CA) for LTE in Release 10. Although initially introduced with two downlink carriers, 3GPP expanded carrier aggregation in Release 14 to include up to five downlink carriers and up to three uplink carriers. Other examples of new features and evolutions provided by 3GPP releases include, but are not limited to, License Assisted Access (LAA), enhanced LAA (eLAA), Narrowband Internet of things (NB-IOT), Vehicle-to-Everything (V2X), and High Power User Equipment (HPUE).

3GPP introduced Phase 1 of fifth generation (5G) technology in Release 15, and plans to introduce Phase 2 of 5G technology in Release 16 (targeted for 2020). Subsequent 3GPP releases will further evolve and expand 5G technology. 5G technology is also referred to herein as 5G New Radio (NR).

5G NR supports or plans to support a variety of features, such as communications over millimeter wave spectrum, beamforming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR.

FIG. 1 is a schematic diagram of one example of a communication network 10. The communication network 10 includes a macro cell base station 1, a small cell base station 3, and various examples of user equipment (UE), including a first mobile device 2a, a wireless-connected car 2b, a laptop 2c, a stationary wireless device 2d, a wireless-connected train 2e, a second mobile device 2f, and a third mobile device 2g.

Although specific examples of base stations and user equipment are illustrated in FIG. 1, a communication network can include base stations and user equipment of a wide variety of types and/or numbers.

For instance, in the example shown, the communication network 10 includes the macro cell base station 1 and the small cell base station 3. The small cell base station 3 can operate with relatively lower power, shorter range, and/or with fewer concurrent users relative to the macro cell base station 1. The small cell base station 3 can also be referred to as a femtocell, a picocell, or a microcell. Although the communication network 10 is illustrated as including two base stations, the communication network 10 can be implemented to include more or fewer base stations and/or base stations of other types.

Although various examples of user equipment are shown, the teachings herein are applicable to a wide variety of user equipment, including, but not limited to, mobile phones, tablets, laptops, IoT devices, wearable electronics, customer premises equipment (CPE), wireless-connected vehicles, wireless relays, and/or a wide variety of other communication devices. Furthermore, user equipment includes not only currently available communication devices that operate in a cellular network, but also subsequently developed communication devices that will be readily implementable with the inventive systems, processes, methods, and devices as described and claimed herein.

The illustrated communication network 10 of FIG. 1 supports communications using a variety of cellular technologies, including, for example, 4G LTE and 5G NR. In certain implementations, the communication network 10 is further adapted to provide a wireless local area network (WLAN), such as WiFi. Although various examples of communication technologies have been provided, the communication network 10 can be adapted to support a wide variety of communication technologies.

Various communication links of the communication network 10 have been depicted in FIG. 1. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

In certain implementations, user equipment can communicate with a base station using one or more of 4G LTE, 5G NR, and WiFi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed WiFi frequencies).

As shown in FIG. 1, the communication links include not only communication links between UE and base stations, but also UE to UE communications and base station to base station communications. For example, the communication network 10 can be implemented to support self-fronthaul and/or self-backhaul.

The communication links can operate over a wide variety of frequencies. In certain implementations, communications are supported using 5G NR technology over one or more frequency bands that are less than 6 Gigahertz (GHz) and/or over one or more frequency bands that are greater than 6 GHz. For example, the communication links can serve Frequency Range 1 (FR1), Frequency Range 2 (FR2), or a combination thereof. In one embodiment, one or more of the mobile devices support a HPUE power class specification.

In certain implementations, a base station and/or user equipment communicates using beamforming. For example, beamforming can be used to focus signal strength to overcome path losses, such as high loss associated with communicating over high signal frequencies. In certain embodiments, user equipment, such as one or more mobile phones, communicate using beamforming on millimeter wave frequency bands in the range of 30 GHz to 300 GHz and/or upper centimeter wave frequencies in the range of 6 GHz to 30 GHz, or more particularly, 24 GHz to 30 GHz. Cellular user equipment can communicate using beamforming and/or other techniques over a wide range of frequencies, including, for example, FR2-1 (24 GHz to 52 GHz), FR2-2 (52 GHz to 71 GHz), and/or FR1 (400 MHz to 7125 MHz).

Different users of the communication network 10 can share available network resources, such as available frequency spectrum, in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user. Ultra-reliable low latency communications (uRLLC) refer to technology for communication with very low latency, for instance, less than 2 milliseconds. uRLLC can be used for mission-critical communications such as for autonomous driving and/or remote surgery applications. Massive machine-type communications (mMTC) refer to low cost and low data rate communications associated with wireless connections to everyday objects, such as those associated with Internet of Things (IoT) applications.

The communication network 10 of FIG. 1 can be used to support a wide variety of advanced communication features, including, but not limited to, eMBB, uRLLC, and/or mMTC.

Figure 2A:
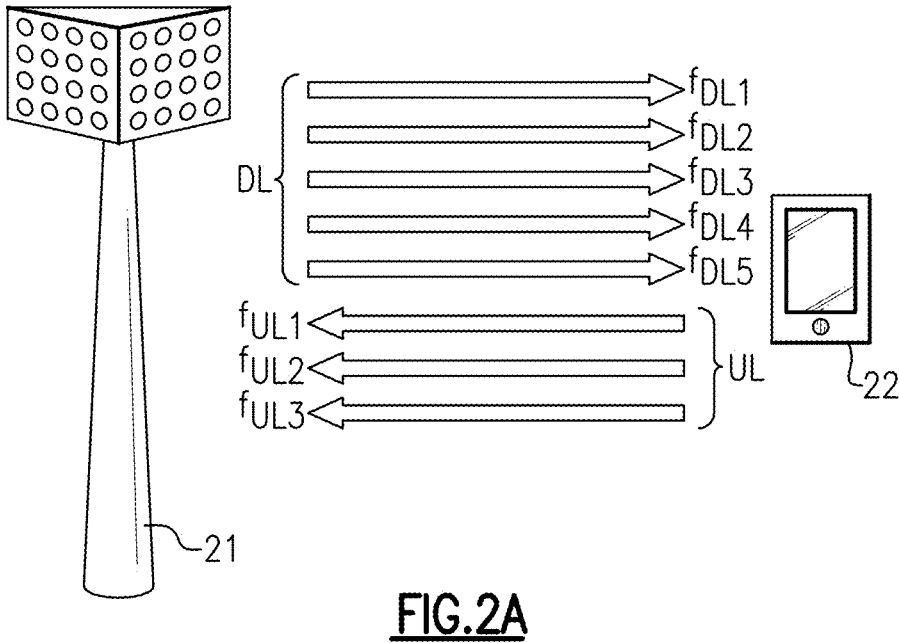
FIG. 2A is a schematic diagram of one example of a communication link using carrier aggregation.

FIG. 2A is a schematic diagram of one example of a communication link using carrier aggregation. Carrier aggregation can be used to widen bandwidth of the communication link by supporting communications over multiple frequency carriers, thereby increasing user data rates and enhancing network capacity by utilizing fragmented spectrum allocations.

In the illustrated example, the communication link is provided between a base station 21 and a mobile device 22. As shown in FIG. 2A, the communications link includes a downlink channel used for RF communications from the base station 21 to the mobile device 22, and an uplink channel used for RF communications from the mobile device 22 to the base station 21.

Although FIG. 2A illustrates carrier aggregation in the context of FDD communications, carrier aggregation can also be used for TDD communications.

In certain implementations, a communication link can provide asymmetrical data rates for a downlink channel and an uplink channel. For example, a communication link can be used to support a relatively high downlink data rate to enable high speed streaming of multimedia content to a mobile device, while providing a relatively slower data rate for uploading data from the mobile device to the cloud.

In the illustrated example, the base station 21 and the mobile device 22 communicate via carrier aggregation, which can be used to selectively increase bandwidth of the communication link. Carrier aggregation includes contiguous aggregation, in which contiguous carriers within the same operating frequency band are aggregated. Carrier aggregation can also be non-contiguous, and can include carriers separated in frequency within a common band or in different bands.

In the example shown in FIG. 2A, the uplink channel includes three aggregated component carriers $f_{UL1}$, $f_{UL2}$, and $f_{UL3}$. Additionally, the downlink channel includes five aggregated component carriers $f_{DL1}$, $f_{DL2}$, $f_{DL3}$, $f_{DL4}$, and $f_{DL5}$. Although one example of component carrier aggregation is shown, more or fewer carriers can be aggregated for uplink and/or downlink. Moreover, a number of aggregated carriers can be varied over time to achieve desired uplink and downlink data rates.

For example, a number of aggregated carriers for uplink and/or downlink communications with respect to a particular mobile device can change over time. For example, the number of aggregated carriers can change as the device moves through the communication network and/or as network usage changes over time.

Figure 2B:
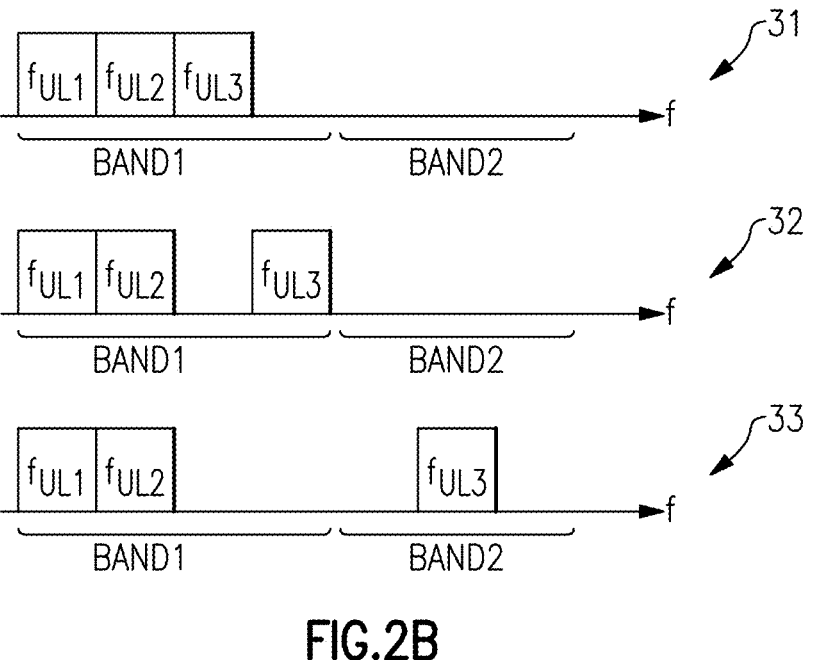
FIG. 2B illustrates various examples of uplink carrier aggregation for the communication link of FIG. 2A.

FIG. 2B illustrates various examples of uplink carrier aggregation for the communication link of FIG. 2A. FIG. 2B includes a first carrier aggregation scenario 31, a second carrier aggregation scenario 32, and a third carrier aggregation scenario 33, which schematically depict three types of carrier aggregation.

The carrier aggregation scenarios 31-33 illustrate different spectrum allocations for a first component carrier $f_{UL1}$, a second component carrier $f_{UL2}$, and a third component carrier $f_{UL3}$. Although FIG. 2B is illustrated in the context of aggregating three component carriers, carrier aggregation can be used to aggregate more or fewer carriers. Moreover, although illustrated in the context of uplink, the aggregation scenarios are also applicable to downlink.

The first carrier aggregation scenario 31 illustrates intra-band contiguous carrier aggregation, in which component carriers that are adjacent in frequency and in a common frequency band are aggregated. For example, the first carrier aggregation scenario 31 depicts aggregation of component carriers $f_{UL1}$, $f_{UL2}$, and $f_{UL3}$ that are contiguous and located within a first frequency band BAND1.

With continuing reference to FIG. 2B, the second carrier aggregation scenario 32 illustrates intra-band non-continuous carrier aggregation, in which two or more components carriers that are non-adjacent in frequency and within a common frequency band are aggregated. For example, the second carrier aggregation scenario 32 depicts aggregation of component carriers $f_{UL1}$, $f_{UL2}$, and $f_{UL3}$ that are non-contiguous, but located within a first frequency band BAND1.

The third carrier aggregation scenario 33 illustrates inter-band non-contiguous carrier aggregation, in which component carriers that are non-adjacent in frequency and in multiple frequency bands are aggregated. For example, the third carrier aggregation scenario 33 depicts aggregation of component carriers $f_{UL1}$, and $f_{UL2}$ of a first frequency band BAND1 with component carrier $f_{UL3}$ of a second frequency band BAND2.

Figure 2C:
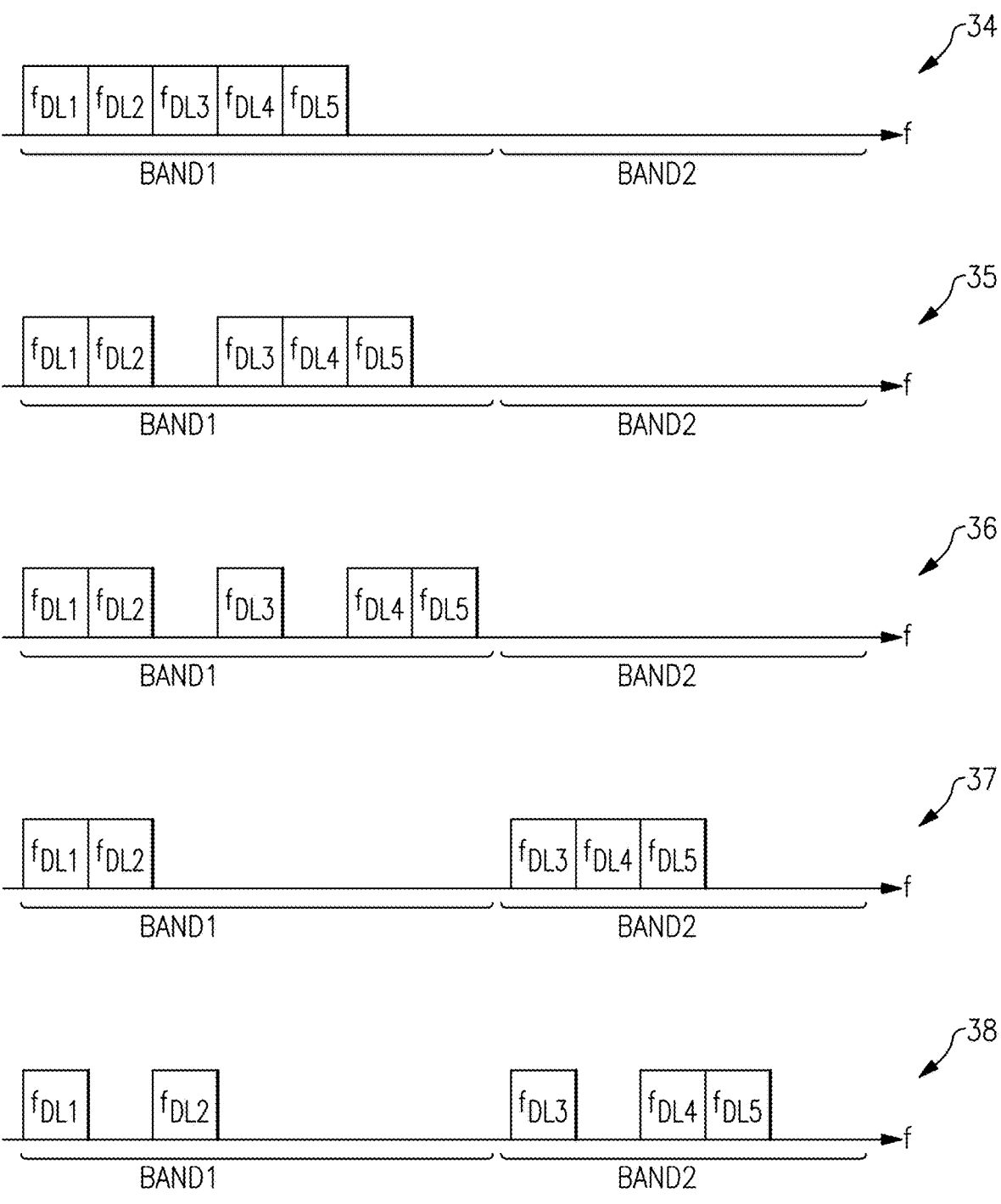
FIG. 2C illustrates various examples of downlink carrier aggregation for the communication link of FIG. 2A.

FIG. 2C illustrates various examples of downlink carrier aggregation for the communication link of FIG. 2A. The examples depict various carrier aggregation scenarios 34-38 for different spectrum allocations of a first component carrier $f_{DL1}$, a second component carrier $f_{DL2}$, a third component carrier $f_{DL3}$, a fourth component carrier $f_{DL4}$, and a fifth component carrier $f_{DL5}$. Although FIG. 2C is illustrated in the context of aggregating five component carriers, carrier aggregation can be used to aggregate more or fewer carriers. Moreover, although illustrated in the context of downlink, the aggregation scenarios are also applicable to uplink.

The first carrier aggregation scenario 34 depicts aggregation of component carriers that are contiguous and located within the same frequency band. Additionally, the second carrier aggregation scenario 35 and the third carrier aggregation scenario 36 illustrates two examples of aggregation that are non-contiguous, but located within the same frequency band. Furthermore, the fourth carrier aggregation scenario 37 and the fifth carrier aggregation scenario 38 illustrates two examples of aggregation in which component carriers that are non-adjacent in frequency and in multiple frequency bands are aggregated. As a number of aggregated component carriers increases, a complexity of possible carrier aggregation scenarios also increases.

With reference to FIGS. 2A-2C, the individual component carriers used in carrier aggregation can be of a variety of frequencies, including, for example, frequency carriers in the same band or in multiple bands. Additionally, carrier aggregation is applicable to implementations in which the individual component carriers are of about the same bandwidth as well as to implementations in which the individual component carriers have different bandwidths.

Certain communication networks allocate a particular user device with a primary component carrier (PCC) or anchor carrier for uplink and a PCC for downlink. Additionally, when the mobile device communicates using a single frequency carrier for uplink or downlink, the user device communicates using the PCC. To enhance bandwidth for uplink communications, the uplink PCC can be aggregated with one or more uplink secondary component carriers (SCCs). Additionally, to enhance bandwidth for downlink communications, the downlink PCC can be aggregated with one or more downlink SCCs.

In certain implementations, a communication network provides a network cell for each component carrier. Additionally, a primary cell can operate using a PCC, while a secondary cell can operate using a SCC. The primary and second cells may have different coverage areas, for instance, due to differences in frequencies of carriers and/or network environment.

License assisted access (LAA) refers to downlink carrier aggregation in which a licensed frequency carrier associated with a mobile operator is aggregated with a frequency carrier in unlicensed spectrum, such as WiFi. LAA employs a downlink PCC in the licensed spectrum that carries control and signaling information associated with the communication link, while unlicensed spectrum is aggregated for wider downlink bandwidth when available. LAA can operate with dynamic adjustment of secondary carriers to avoid WiFi users and/or to coexist with WiFi users. Enhanced license assisted access (eLAA) refers to an evolution of LAA that aggregates licensed and unlicensed spectrum for both downlink and uplink. Furthermore, NR-U can operate on top of LAA/eLAA over a 5 GHz band (5150 to 5925 MHz) and/or a 6 GHz band (5925 MHz to 7125 MHz).

Figure 3A:
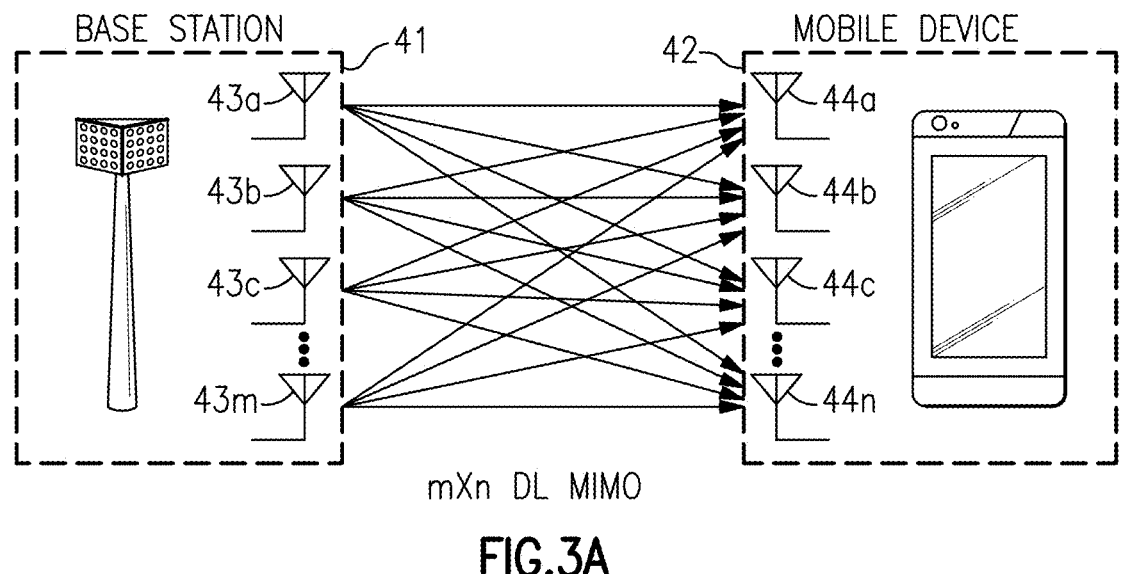
FIG. 3A is a schematic diagram of one example of a downlink channel using multi-input and multi-output (MIMO) communications.
Figure 3B:
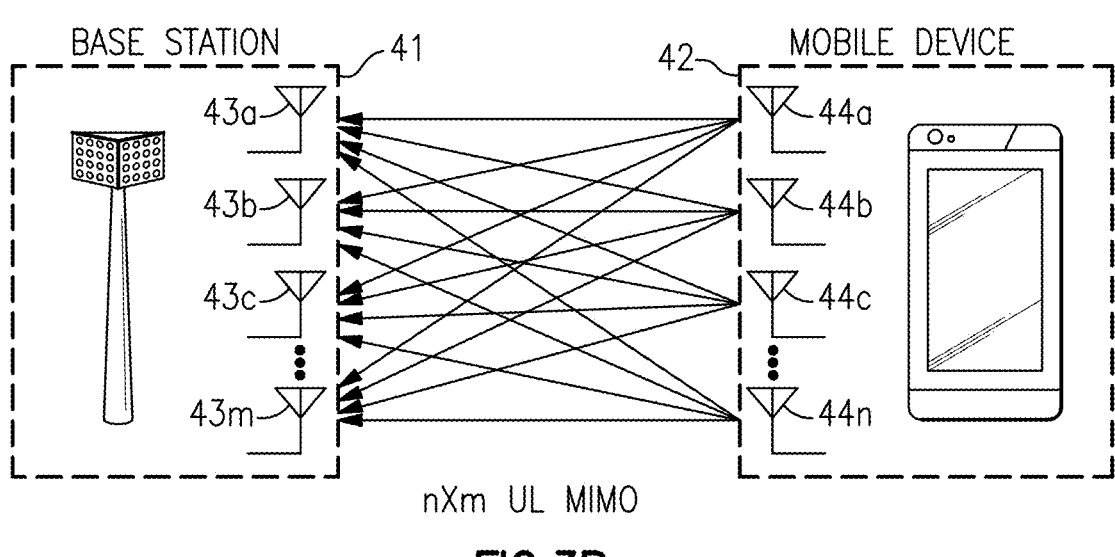
FIG. 3B is schematic diagram of one example of an uplink channel using MIMO communications.

FIG. 3A is a schematic diagram of one example of a downlink channel using multi-input and multi-output (MIMO) communications. FIG. 3B is schematic diagram of one example of an uplink channel using MIMO communications.

MIMO communications use multiple antennas for simultaneously communicating multiple data streams over common frequency spectrum. In certain implementations, the data streams operate with different reference signals to enhance data reception at the receiver. MIMO communications benefit from higher SNR, improved coding, and/or reduced signal interference due to spatial multiplexing differences of the radio environment.

MIMO order refers to a number of separate data streams sent or received. For instance, MIMO order for downlink communications can be described by a number of transmit antennas of a base station and a number of receive antennas for UE, such as a mobile device. For example, two-by-two (2×2) DL MIMO refers to MIMO downlink communications using two base station antennas and two UE antennas. Additionally, four-by-four (4×4) DL MIMO refers to MIMO downlink communications using four base station antennas and four UE antennas.

In the example shown in FIG. 3A, downlink MIMO communications are provided by transmitting using M antennas 43a, 43b, 43c, . . . 43m of the base station 41 and receiving using N antennas 44a, 44b, 44c, . . . 44n of the mobile device 42. Accordingly, FIG. 3A illustrates an example of m×n DL MIMO.

Likewise, MIMO order for uplink communications can be described by a number of transmit antennas of UE, such as a mobile device, and a number of receive antennas of a base station. For example, 2×2 UL MIMO refers to MIMO uplink communications using two UE antennas and two base station antennas. Additionally, 4×4 UL MIMO refers to MIMO uplink communications using four UE antennas and four base station antennas.

In the example shown in FIG. 3B, uplink MIMO communications are provided by transmitting using N antennas 44a, 44b, 44c, . . . 44n of the mobile device 42 and receiving using M antennas 43a, 43b, 43c, . . . 43m of the base station 41. Accordingly, FIG. 3B illustrates an example of n×m UL MIMO.

By increasing the level or order of MIMO, bandwidth of an uplink channel and/or a downlink channel can be increased.

MIMO communications are applicable to communication links of a variety of types, such as FDD communication links and TDD communication links.

Figure 3C:
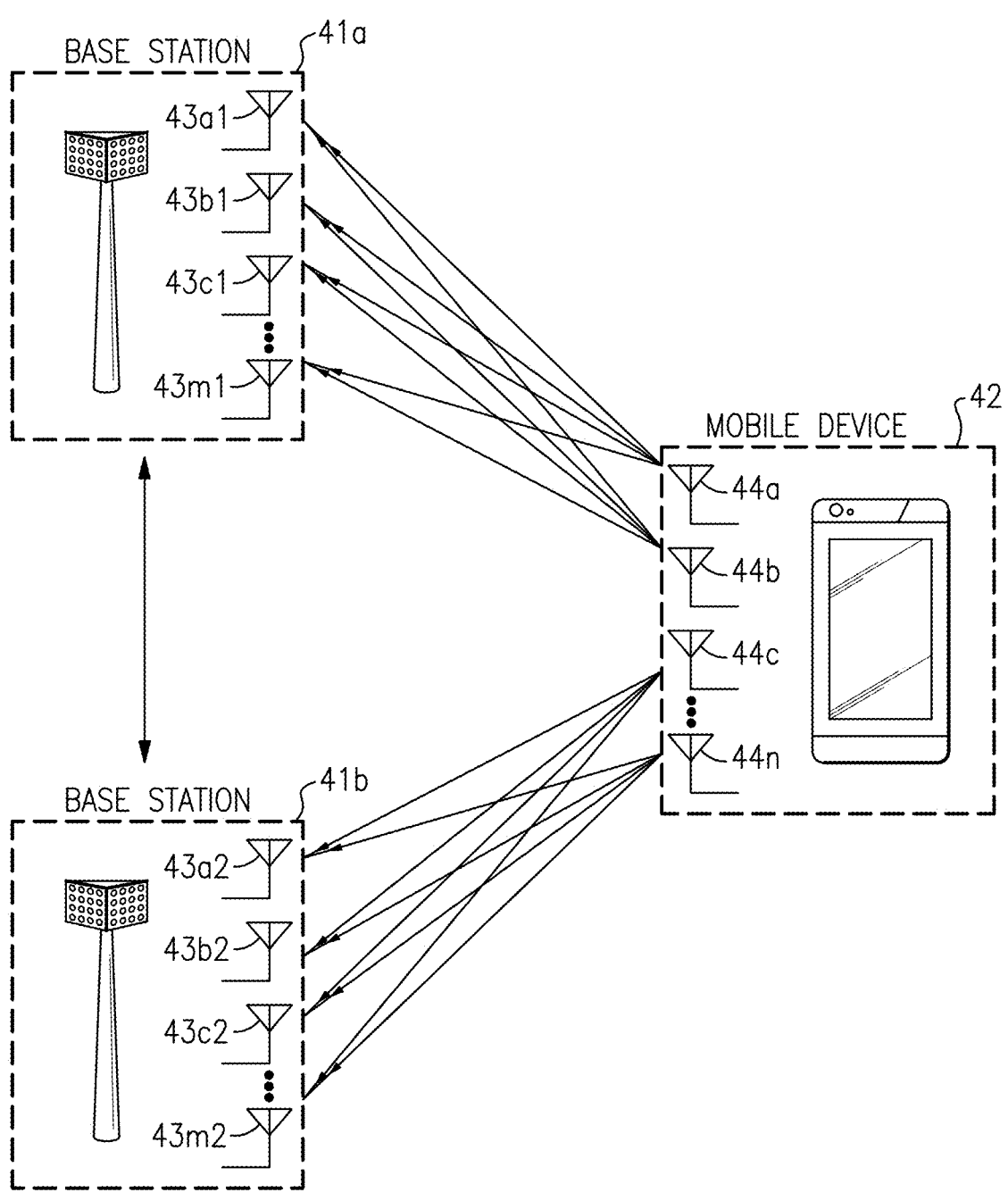
FIG. 3C is schematic diagram of another example of an uplink channel using MIMO communications.

FIG. 3C is schematic diagram of another example of an uplink channel using MIMO communications. In the example shown in FIG. 3C, uplink MIMO communications are provided by transmitting using N antennas 44a, 44b, 44c, . . . 44n of the mobile device 42. Additionally, a first portion of the uplink transmissions are received using M antennas 43a1, 43b1, 43c1, . . . 43m1 of a first base station 41a, while a second portion of the uplink transmissions are received using M antennas 43a2, 43b2, 43c2, . . . 43m2 of a second base station 41b. Additionally, the first base station 41a and the second base station 41b communication with one another over wired, optical, and/or wireless links.

The MIMO scenario of FIG. 3C illustrates an example in which multiple base stations cooperate to facilitate MIMO communications.

Figure 4:
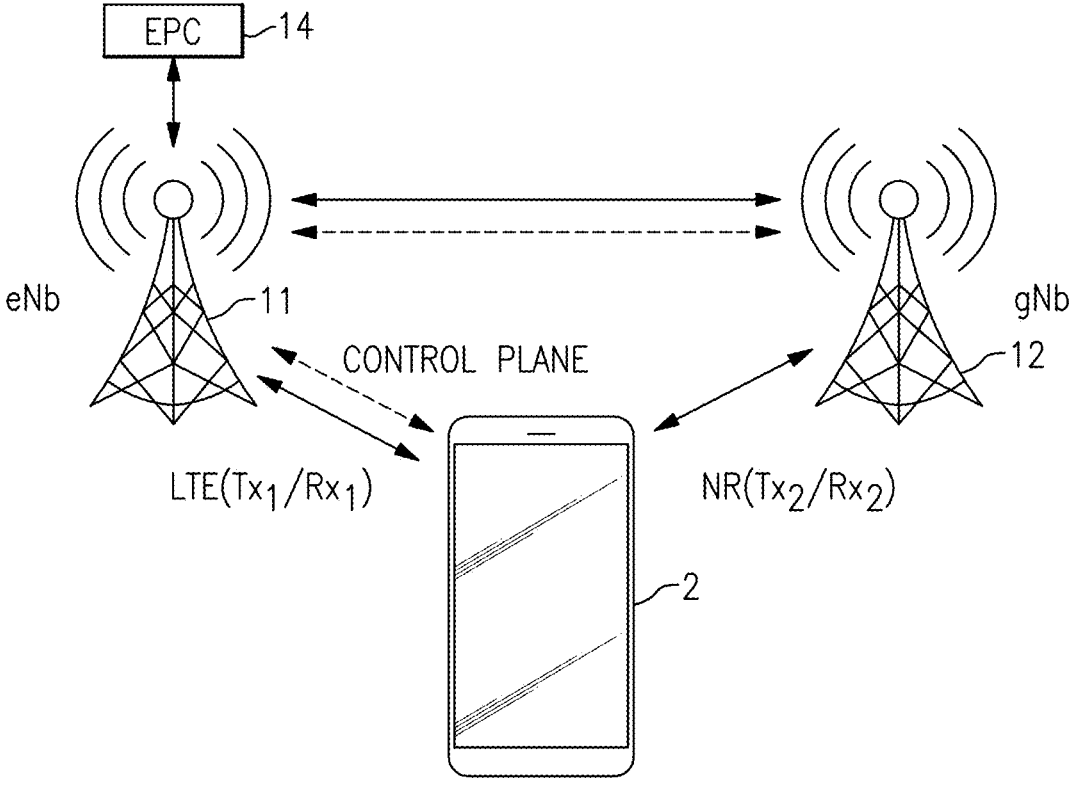
FIG. 4 is a schematic diagram of an example dual connectivity network topology.

FIG. 4 is a schematic diagram of an example dual connectivity network topology. This architecture can leverage LTE legacy coverage to ensure continuity of service delivery and the progressive rollout of 5G cells. A UE 2 can simultaneously transmit dual uplink LTE and NR carrier. The UE 2 can transmit an uplink LTE carrier Tx1 to the eNB 11 while transmitting an uplink NR carrier Tx2 to the gNB 12 to implement dual connectivity. Any suitable combination of uplink carriers Tx1, Tx2 and/or downlink carriers Rx1, Rx2 can be concurrently transmitted via wireless links in the example network topology of FIG. 1. The eNB 11 can provide a connection with a core network, such as an Evolved Packet Core (EPC) 14. The gNB 12 can communicate with the core network via the eNB 11. Control plane data can be wireless communicated between the UE 2 and eNB 11. The eNB 11 can also communicate control plane data with the gNB 12. Control plane data can propagate along the paths of the dashed lines in FIG. 4. The solid lines in FIG. 4 are for data plane paths.

In the example dual connectivity topology of FIG. 4, any suitable combinations of standardized bands and radio access technologies (e.g., FDD, TDD, SUL, SDL) can be wirelessly transmitted and received. This can present technical challenges related to having multiple separate radios and bands functioning in the UE 2. With a TDD LTE anchor point, network operation may be synchronous, in which case the operating modes can be constrained to Tx1/Tx2 and Rx1/Rx2, or asynchronous which can involve Tx1/Tx2, Tx1/Rx2, Rx1/Tx2, Rx1/Rx2. When the LTE anchor is a frequency division duplex (FDD) carrier, the TDD/FDD inter-band operation can involve simultaneous Tx1/Rx1/Tx2 and Tx1/Rx1/Rx2.

As discussed above, EN-DC can involve both 4G and 5G carriers being simultaneously transmitted from a UE. Transmitting both 4G and 5G carriers in a UE, such as a phone, typically involves two power amplifiers (PAs) being active at the same time. Traditionally, having two power amplifiers active simultaneously would involve the placement of one or more additional power amplifiers specifically suited for EN-DC operation. Additional board space and expense is incurred when designing to support such EN-DC/NSA operation.

Figure 5A:
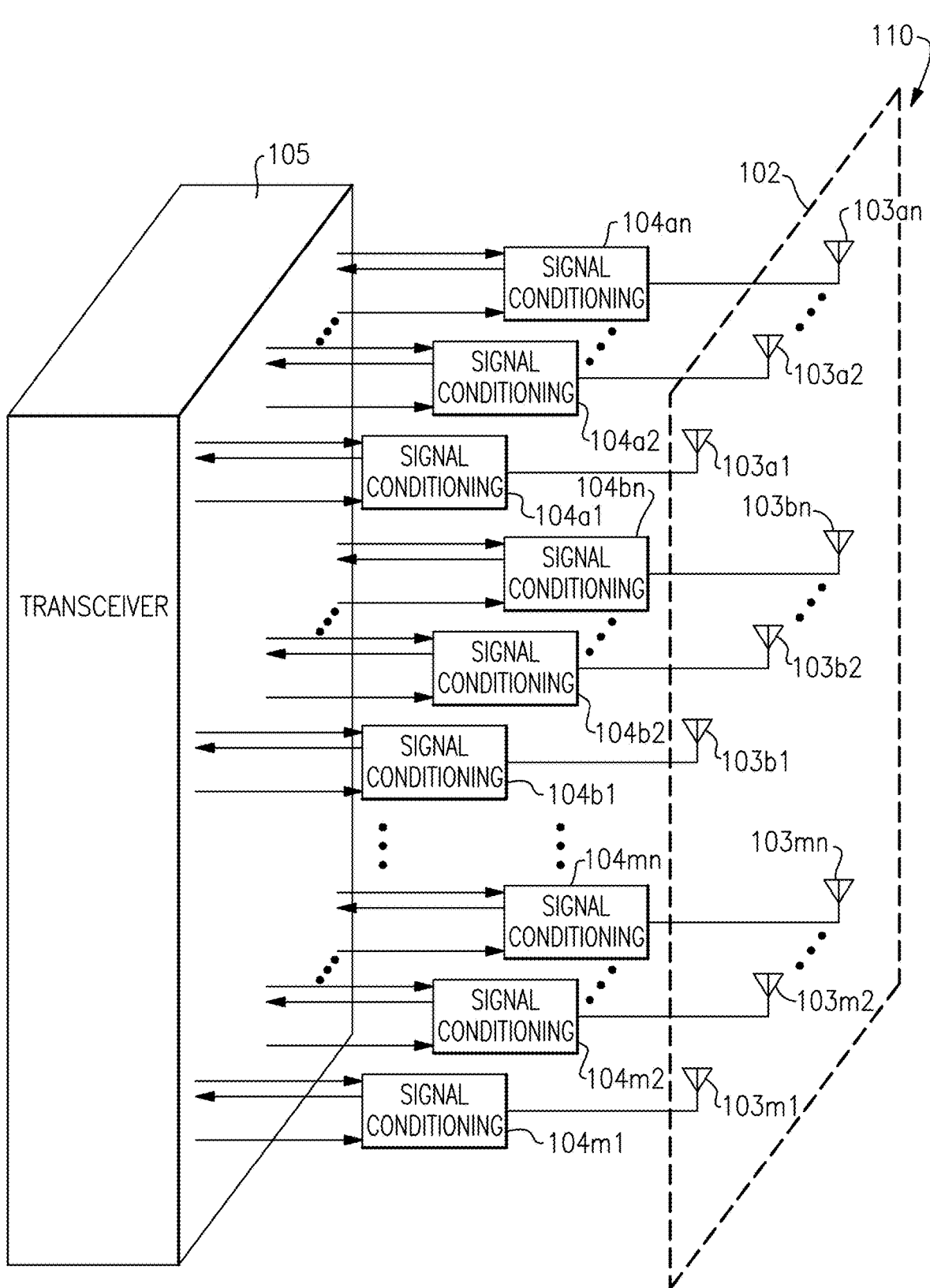
FIG. 5A is a schematic diagram of one example of a communication system that operates with beamforming.

FIG. 5A is a schematic diagram of one example of a communication system 110 that operates with beamforming. The communication system 110 includes a transceiver 105, signal conditioning circuits 104a1, 104a2 . . . 104an, 104b1, 104b2 . . . 104bn, 104m1, 104m2 . . . 104mn, and an antenna array 102 that includes antenna elements 103a1, 103a2 . . . 103an, 103b1, 103b2 . . . 103bn, 103m1, 103m2 . . . 103mn.

Communications systems that communicate using millimeter wave carriers (for instance, 30 GHz to 300 GHz), centimeter wave carriers (for instance, 3 GHz to 30 GHz), and/or other frequency carriers can employ an antenna array to provide beam formation and directivity for transmission and/or reception of signals.

For example, in the illustrated embodiment, the communication system 110 includes an array 102 of m×n antenna elements, which are each controlled by a separate signal conditioning circuit, in this embodiment. As indicated by the ellipses, the communication system 110 can be implemented with any suitable number of antenna elements and signal conditioning circuits.

With respect to signal transmission, the signal conditioning circuits can provide transmit signals to the antenna array 102 such that signals radiated from the antenna elements combine using constructive and destructive interference to generate an aggregate transmit signal exhibiting beam-like qualities with more signal strength propagating in a given direction away from the antenna array 102.

In the context of signal reception, the signal conditioning circuits process the received signals (for instance, by separately controlling received signal phases) such that more signal energy is received when the signal is arriving at the antenna array 102 from a particular direction. Accordingly, the communication system 110 also provides directivity for reception of signals.

The relative concentration of signal energy into a transmit beam or a receive beam can be enhanced by increasing the size of the array. For example, with more signal energy focused into a transmit beam, the signal propagates for a longer range while providing sufficient signal level for RF communications. For instance, a signal with a large proportion of signal energy focused into the transmit beam can exhibit high effective isotropic radiated power (EIRP).

In the illustrated embodiment, the transceiver 105 provides transmit signals to the signal conditioning circuits and processes signals received from the signal conditioning circuits. As shown in FIG. 5A, the transceiver 105 generates control signals for the signal conditioning circuits. The control signals can be used for a variety of functions, such as controlling the gain and phase of transmitted and/or received signals to control beamforming.

Figure 5B:
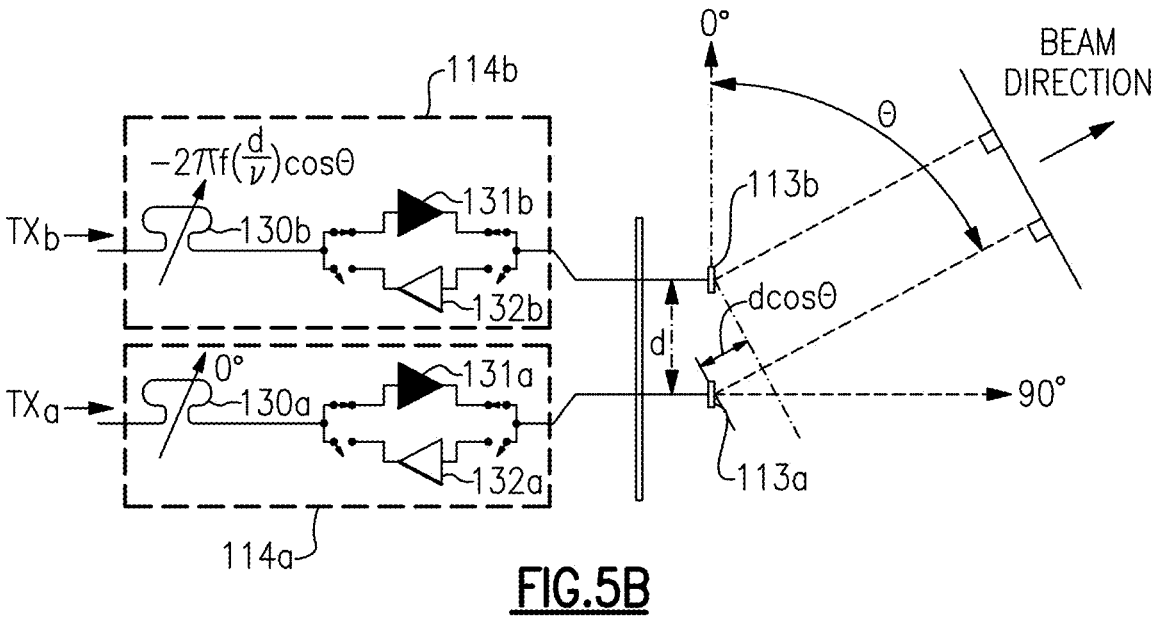
FIG. 5B is a schematic diagram of one example of beamforming to provide a transmit beam.

FIG. 5B is a schematic diagram of one example of beamforming to provide a transmit beam. FIG. 5B illustrates a portion of a communication system including a first signal conditioning circuit 114a, a second signal conditioning circuit 114b, a first antenna element 113a, and a second antenna element 113b.

Although illustrated as included two antenna elements and two signal conditioning circuits, a communication system can include additional antenna elements and/or signal conditioning circuits. For example, FIG. 5B illustrates one embodiment of a portion of the communication system 110 of FIG. 5A.

The first signal conditioning circuit 114a includes a first phase shifter 130a, a first power amplifier 131a, a first low noise amplifier (LNA) 132a, and switches for controlling selection of the power amplifier 131a or LNA 132a. Additionally, the second signal conditioning circuit 114b includes a second phase shifter 130b, a second power amplifier 131b, a second LNA 132b, and switches for controlling selection of the power amplifier 131b or LNA 132b.

Although one embodiment of signal conditioning circuits is shown, other implementations of signal conditioning circuits are possible. For instance, in one example, a signal conditioning circuit includes one or more band filters, duplexers, and/or other components.

In the illustrated embodiment, the first antenna element 113a and the second antenna element 113b are separated by a distance d. Additionally, FIG. 5B has been annotated with an angle $\theta$, which in this example has a value of about 90° when the transmit beam direction is substantially perpendicular to a plane of the antenna array and a value of about 0° when the transmit beam direction is substantially parallel to the plane of the antenna array.

By controlling the relative phase of the transmit signals provided to the antenna elements 113a, 113b, a desired transmit beam angle $\theta$ can be achieved. For example, when the first phase shifter 130a has a reference value of 0°, the second phase shifter 130b can be controlled to provide a phase shift of about $-2\pi f(d/v)\cos\theta$ radians, where f is the fundamental frequency of the transmit signal, d is the distance between the antenna elements, v is the velocity of the radiated wave, and $\pi$ is the mathematic constant pi.

In certain implementations, the distance d is implemented to be about $\frac{1}{2}\lambda$, where $\lambda$, is the wavelength of the fundamental component of the transmit signal. In such implementations, the second phase shifter 130b can be controlled to provide a phase shift of about $-\pi\cos\theta$ radians to achieve a transmit beam angle $\theta$.

Accordingly, the relative phase of the phase shifters 130a, 130b can be controlled to provide transmit beamforming. In certain implementations, a baseband processor and/or a transceiver (for example, the transceiver 105 of FIG. 5A) controls phase values of one or more phase shifters and gain values of one or more controllable amplifiers to control beamforming.

Figure 5C:
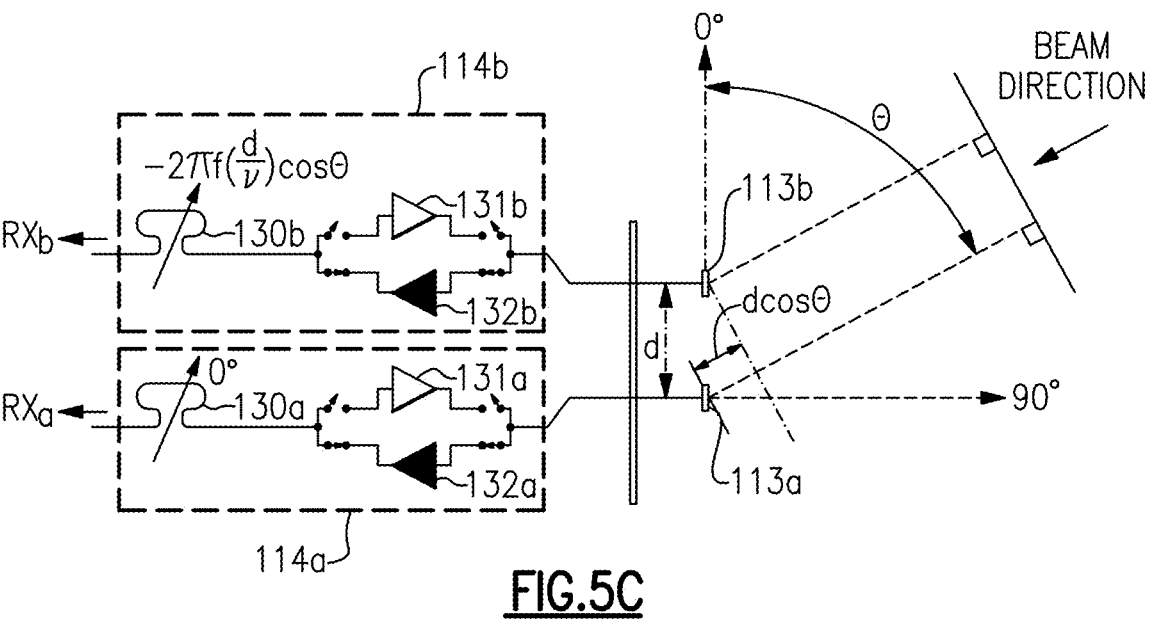
FIG. 5C is a schematic diagram of one example of beamforming to provide a receive beam.

FIG. 5C is a schematic diagram of one example of beamforming to provide a receive beam. FIG. 5C is similar to FIG. 5B, except that FIG. 5C illustrates beamforming in the context of a receive beam rather than a transmit beam.

As shown in FIG. 5C, a relative phase difference between the first phase shifter 130a and the second phase shifter 130b can be selected to about equal to $-2\pi f(d/v)\cos\theta$ radians to achieve a desired receive beam angle $\theta$. In implementations in which the distance d corresponds to about $\frac{1}{2}\lambda$, the phase difference can be selected to about equal to $-\pi\cos\theta$ radians to achieve a receive beam angle $\theta$.

Although various equations for phase values to provide beamforming have been provided, other phase selection values are possible, such as phase values selected based on implementation of an antenna array, implementation of signal conditioning circuits, and/or a radio environment.

In cellular networks, such as 5G networks, sounding reference signal (SRS) features can be enabled to determine channel qualities of a communication link between user equipment (UE) (for example, a wireless device such as a mobile phone) and a base station. SRS symbols are transmitted on uplink and processed by the network to estimate the quality of the wireless channel at different frequencies. For instance, the SRS symbols transmitted by the UE can be used by the base station to estimate the quality of the uplink channel for large bandwidths outside the assigned frequency span to the UE.

For the case of 4×4 MIMO, SRS relies on the transmission in uplink (UL) of known symbols to each of four receive antennas. By receiving each of these known transmissions from each antenna, the gNodeB base station can develop an accurate channel model for the RF path from each of the antennas back to the gNodeB. Additionally, with respect to downlink (DL), the reciprocal nature of the UL and DL in TDD enables a much better transfer function for each of the antenna RF channel models, and the SNR can be significantly improved for both higher order MIMO as well as higher order receive (Rx) diversity.

Although SRS provides a number of benefits, SRS can interfere with certain features, such as carrier aggregation and/or EN-DC connectivity.

Front-end systems can be used to process signals of a wide range of frequencies. For example, certain front-end systems can operate using one or more low bands (for example, RF signal bands having a frequency content of 1

GHz or less, also referred to herein as LB), one or more mid bands (for example, RF signal bands having a frequency content between 1 GHz and 2.3 GHz, also referred to herein as MB), one or more high bands (for example, RF signal bands having a frequency content between 2.3 GHz and 3 GHz, also referred to herein as HB), and/or various 5G frequency bands such as n41, n77 or n79. MHB frequency content refers to frequency content covering at least a portion of MB and at least a portion of HB, for instance, a frequency content between 1 GHz and 3 GHz.

Figure 6:
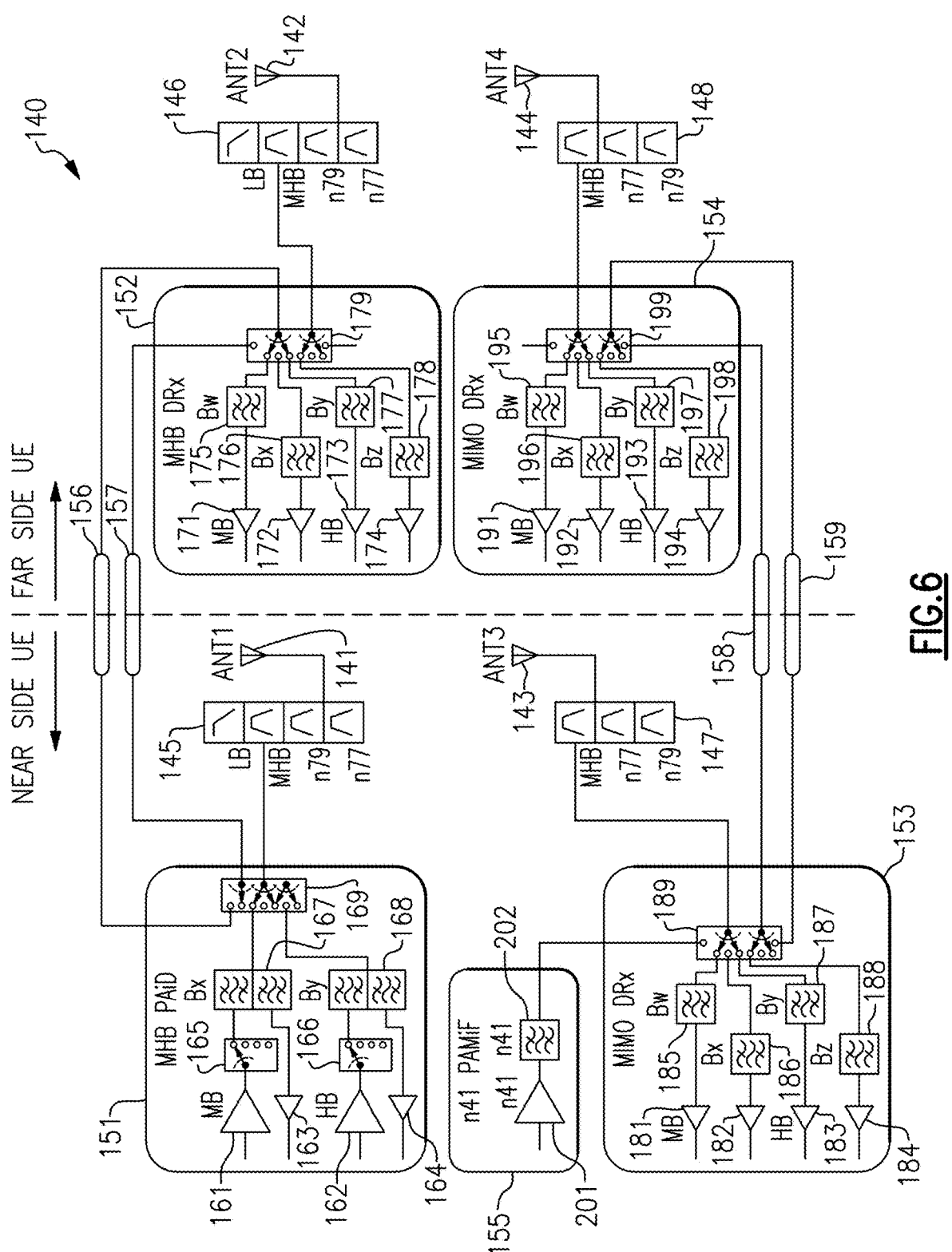
FIG. 6 is a schematic diagram of one example of a front-end system for a mobile device.

FIG. 6 is a schematic diagram of one example of a front-end system 140 for a mobile device. The front-end system 140 is connected to a first antenna 141, a second antenna 142, a third antenna 143, and a fourth antenna 144. The front-end system 140 includes a first antenna-plexer 145 (with sections for LB/MHB/n79/n77), a second antenna-plexer 146 (with sections for LB/MHB/n79/n77), a third antenna-plexer 147 (with sections for MHB/n77/n79), a fourth antenna-plexer 148 (with sections for MHB/n77/n79), a mid band/high band (MHB) power amplifier integrated duplexer (PAiD) module 151, an MHB diversity receive (DRx) module 152, a first MIMO DRx module 153, a second MIMO DRx module 154, a 5G band n41 power amplifier module with integrated filter (PAMiF) 155, a first cross-UE cable 156, a second cross-UE cable 157, a third cross-UE cable 158, and a fourth cross-UE cable 159.

The MHB PAiD module 151 includes a MB power amplifier 161, a HB power amplifier 162, a MB LNA 163, a HB LNA 164, a first band filter switch 165, a second band filter switch 166, a band Bx duplexer 167, a band By duplexer 168, and a first antenna access switch 169 for accessing the first antenna 141. The n41 PAMiF 155 includes an n41 power amplifier 201, and an n41 filter 202.

With continuing reference to FIG. 6, the MHB DRx module 152 includes a first MB LNA 171, a second MB LNA 172, a first HB LNA 173, a second HB LNA 174, a band Bw filter 175, a band Bx filter 176, a band By filter 177, a band Bz filter 178, and a second antenna access switch 179 for accessing the second antenna 142. Additionally, the first MIMO DRx module 153 includes a first MB LNA 181, a second MB LNA 182, a first HB LNA 183, a second HB LNA 184, a band Bw filter 185, a band Bx filter 186, a band By filter 187, a band Bz filter 188, and a third antenna access switch 189 for accessing the third antenna 143. Furthermore, the second MIMO DRx module 154 includes a first MB LNA 191, a second MB LNA 192, a first HB LNA 193, a second HB LNA 194, a band Bw filter 195, a band Bx filter 196, a band By filter 197, a band Bz filter 198, and a fourth antenna access switch 199 for accessing the fourth antenna 144.

With respect to the front-end system 140 of FIG. 6, an n41 RF transmit signal is provided through the first MIMO DRx module 153 from the n41 PAMiF 155. This supports SRS hopping for n41 at fast speeds, while also supporting antenna swap features. However, implementing the front-end system 140 in this manner interferes with carrier aggregation support and/or EN-DC support.

For example, when the n41 PAMiF 155 is transmitting for SRS, an anchor carrier (for example, an LTE signal on MB) and/or carrier aggregation is interrupted.

Front-end systems with antenna switching that bypasses a transmit band filter are disclosed herein. In certain embodiments, a front-end architecture is based on switching the RF transmit signal (Tx) behind or before the bandpass filter of the band. This enables the switch-combining and filter ganging used to support carrier aggregation and EN-DC connectivity to be maintained, and the SRS switching done this way for a target TDD band does not impact, interrupt, and/or otherwise re-route the partner bands. Accordingly, both an anchor carrier and a secondary carrier can be maintained without interruption or impact. Furthermore, carrier aggregation features can be maintained and is not interrupted by SRS.

In certain implementations, one or more receive filters in the front-end is implemented as a transmit-capable filter with associated design attention (for example, size and/or power handling capability). Thus, RF transmit signals can be filtered by receive filters in certain modes.

Moreover, enhanced connectivity pre-bandpass filter enables 4×4 DL MIMO and carrier aggregation support for ganged and switch-combined filter combinations implemented post-bandpass filter. Thus, the insertion loss, route count, integration, and/or overall performance is improved. Such a solution improves the specific SRS antenna switching connectivity of the targeted band, while avoiding forced modifications or enlargements of the antenna switch to support needless flexibility of all the other bands. Thus, bands which may not require such a feature (for instance, FDD bands) need not have impacted performance.

Figures 7A, 7B:
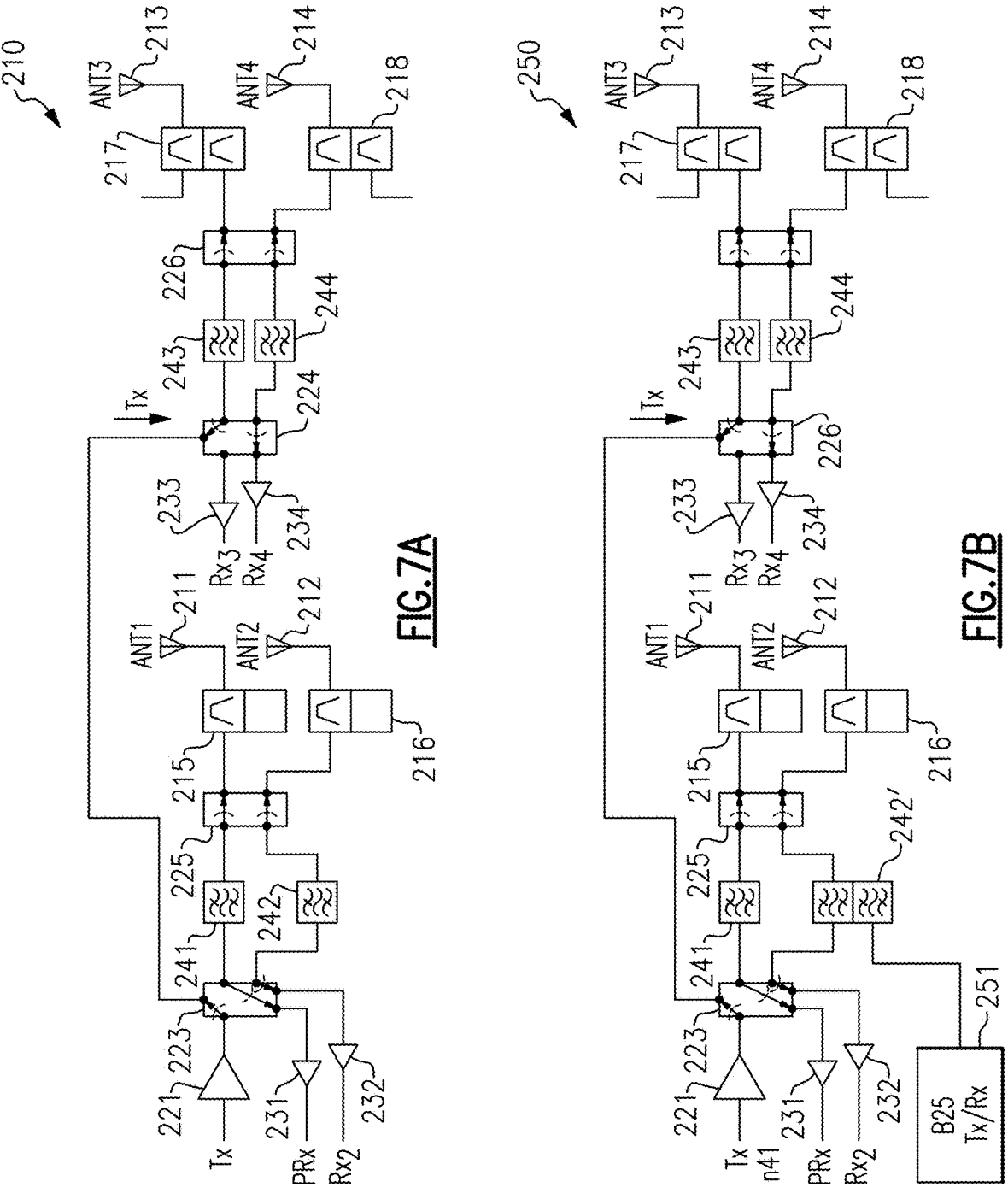
FIG. 7A is a schematic diagram of a front-end system according to one embodiment.
FIG. 7B is a schematic diagram of a front-end system according to another embodiment.

FIG. 7A is a schematic diagram of a front-end system 210 according to one embodiment. The front-end system 210 is connected to a first antenna 211, a second antenna 212, a third antenna 213, and a fourth antenna 214. The front-end system 210 includes a first antenna-plexer 215, a second antenna-plexer 216, a third antenna-plexer 217, a fourth antenna-plexer 218, a power amplifier 221, a first amplifier selection switch 223, a second amplifier selection switch 224, a first antenna switch 225, a second antenna switch 226, a first LNA 231, a second LNA 232, a third LNA 233, a fourth LNA 234, a first band filter 241, a second band filter 242, a third band filter 243, and a fourth band filter 244.

As shown in FIG. 7A, the power amplifier 221 amplifies an RF transmit signal Tx. The RF transmit signal Tx can be any suitable frequency band. In certain implementations, the RF transmit signal Tx is a 5G signal.

The RF transmit signal Tx can be provide to any of the antennas 211-214 for SRS.

The first antenna 211 can be accessed by way of the first amplifier selection switch 223, the first filter 241, the first antenna switch 225, and the first antenna-plexer 215. Additionally, the second antenna 212 can be accessed by way of the first amplifier selection switch 223, the first filter 241 (or in another embodiment, the second filter 242), the first antenna switch 225 (which provides cross-bar functionality, in this embodiment), and the second antenna-plexer 216. Furthermore, the third antenna 213 can be accessed by way of the first amplifier selection switch 223, the second amplifier selection switch 224, the third band filter 243, the second antenna switch 226, and the third antenna-plexer 217. Additionally, the fourth antenna 214 can be accessed by way of the first amplifier selection switch 223, the second amplifier selection switch 224, the third band filter 243 (or in another embodiment, the fourth filter 244), the second antenna switch 226 (which provides cross-bar functionality, in this embodiment), and the fourth antenna-plexer 218.

In certain implementations, the RF transmit signal Tx is provided from the first amplifier selection switch 223 to the second amplifier selection switch 224 over a cross-UE cable (for example, the cross-UE cable 156 of FIG. 6).

By implementing the front-end system 210 to provide antenna switching before the transmit band filter, the switch-combining and filter ganging used to support carrier aggregation and EN-DC connectivity is maintained. Accordingly, both an anchor carrier (for example, LTE) and a secondary carrier (for example, 5G using the frequency band of Tx) can be maintained without interruption or impact. Furthermore, additional features, such as MIMO can be supported.

FIG. 7B is a schematic diagram of a front-end system 250 according to another embodiment. The front-end system 250 of FIG. 7B is similar to the front-end system 210 of FIG. 7A, except that the front-end system 250 replaces the second band filter 242 of FIG. 7A with a diplexer 242' and further includes a transmit/receive module 251. As shown in FIG. 7B, the RF transmit signal Tx is 5G n41 and the transmit/receive module 251 operates over B25, in this embodiment.

The front-end system 210 of FIG. 7A can be adapted to include additional band support, and such bands are not interfered with the by SRS switching of the RF transmit signal Tx. For example, any of the filters 241-244 can be replaced with a diplexer (or other band filtering structure such as a triplexer) such that additional RF modules can access one or more of the antennas 211-214. Moreover, the antenna-plexers can handle a wide variety of bands.

Although the front-end system 250 of FIG. 7B illustrates one example modification of the front-end system 210 of FIG. 7A for additional band support, the front-end system 210 of FIG. 7A can be modified in a wide variety of ways to support additional bands.

Figure 8:
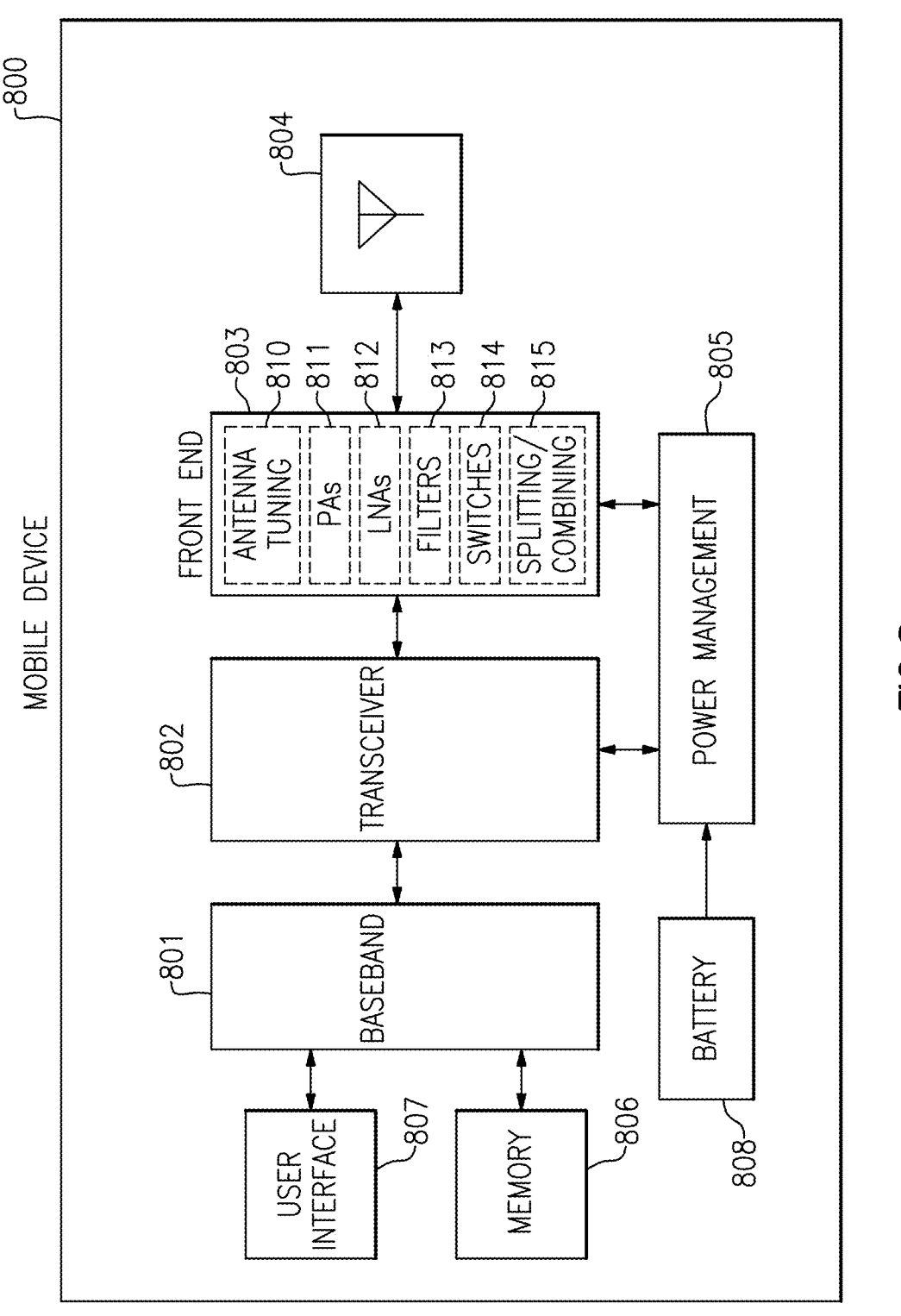
FIG. 8 is a schematic diagram of one embodiment of a mobile device.

FIG. 8 is a schematic diagram of one embodiment of a mobile device 800. The mobile device 800 includes a baseband system 801, a transceiver 802, a front-end system 803, antennas 804, a power management system 805, a memory 806, a user interface 807, and a battery 808.

The mobile device 800 can be used communicate using a wide variety of communications technologies, including, but not limited to, 2G, 3G, 4G (including LTE, LTE-Advanced, and LTE-Advanced Pro), 5G NR, WLAN (for instance, WiFi), WPAN (for instance, Bluetooth and ZigBee), WMAN (for instance, WiMax), and/or GPS technologies.

The transceiver 802 generates RF signals for transmission and processes incoming RF signals received from the antennas 804. It will be understood that various functionalities associated with the transmission and receiving of RF signals can be achieved by one or more components that are collectively represented in FIG. 8 as the transceiver 802. In one example, separate components (for instance, separate circuits or dies) can be provided for handling certain types of RF signals.

The front-end system 803 aids in conditioning signals transmitted to and/or received from the antennas 804. In the illustrated embodiment, the front-end system 803 includes antenna tuning circuitry 810, power amplifiers (PAs) 811, low noise amplifiers (LNAs) 812, filters 813, switches 814, and signal splitting/combining circuitry 815. However, other implementations are possible.

For example, the front-end system 803 can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

In certain implementations, the mobile device 800 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 804 can include antennas used for a wide variety of types of communications. For example, the antennas 804 can include antennas for transmitting and/or receiving signals associated with a wide variety of frequencies and communications standards.

In certain implementations, the antennas 804 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The mobile device 800 can operate with beamforming in certain implementations. For example, the front-end system 803 can include amplifiers having controllable gain and phase shifters having controllable phase to provide beam formation and directivity for transmission and/or reception of signals using the antennas 804. For example, in the context of signal transmission, the amplitude and phases of the transmit signals provided to the antennas 804 are controlled such that radiated signals from the antennas 804 combine using constructive and destructive interference to generate an aggregate transmit signal exhibiting beam-like qualities with more signal strength propagating in a given direction. In the context of signal reception, the amplitude and phases are controlled such that more signal energy is received when the signal is arriving to the antennas 804 from a particular direction. In certain implementations, the antennas 804 include one or more arrays of antenna elements to enhance beamforming.

The baseband system 801 is coupled to the user interface 807 to facilitate processing of various user input and output (I/O), such as voice and data. The baseband system 801 provides the transceiver 802 with digital representations of transmit signals, which the transceiver 802 processes to generate RF signals for transmission. The baseband system 801 also processes digital representations of received signals provided by the transceiver 802. As shown in FIG. 8, the baseband system 801 is coupled to the memory 806 of facilitate operation of the mobile device 800.

The memory 806 can be used for a wide variety of purposes, such as storing data and/or instructions to facilitate the operation of the mobile device 800 and/or to provide storage of user information.

The power management system 805 provides a number of power management functions of the mobile device 800. In certain implementations, the power management system 805 includes a PA supply control circuit that controls the supply voltages of the power amplifiers 811. For example, the power management system 805 can be configured to change the supply voltage(s) provided to one or more of the power amplifiers 811 to improve efficiency, such as power added efficiency (PAE).

As shown in FIG. 8, the power management system 805 receives a battery voltage from the battery 808. The battery 808 can be any suitable battery for use in the mobile device 800, including, for example, a lithium-ion battery.

Applications

17

Some of the embodiments described above have provided examples in connection with mobile devices. However, the principles and advantages of the embodiments can be used for a wide range of RF communication systems. Examples of such RF communication systems include, but are not limited to, mobile phones, tablets, base stations, network access points, customer-premises equipment (CPE), laptops, and wearable electronics.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "may," "could," "might," "can," "e.g.," "for example," "such as" and the like, unless specifically stated otherwise, or otherwise understood within the context as used, is generally intended to convey that certain embodiment includes, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A mobile device comprising:
a plurality of antennas; and
a front-end system coupled to the plurality of antennas, the front-end system including a power amplifier configured to receive a radio frequency transmit signal at an input, a first amplifier selection switch connected to an output of the power amplifier, a first antenna switch, a transmit band filter directly connected between the first antenna switch and the first amplifier selection switch, a second amplifier selection switch connected to the first amplifier selection switch, a second antenna switch, and a receive band filter directly connected between the second antenna switch and the second amplifier selection switch, the power amplifier corresponding to a final amplifier in a transmit signal path to the plurality of antennas.

2. The mobile device of claim 1 wherein the plurality of antennas include a first antenna, a second antenna, a third antenna, and a fourth antenna.

3. The mobile device of claim 2 wherein the radio frequency transmit signal is provided to the first antenna and the second antenna through the first amplifier selection switch and the first antenna switch.

4. The mobile device of claim 3 wherein the radio frequency transmit signal is provided to the third antenna and the fourth antenna through the first amplifier selection switch, the second amplifier selection switch, and the second antenna switch.

5. The mobile device of claim 4 wherein the first antenna switch and the second antenna switch are each a cross-bar switch.

6. The mobile device of claim 1 further comprising a low noise amplifier connected to the receive filter through the second amplifier selection switch.

7. The mobile device of claim 1 wherein the front-end system is configured to provide sounding reference signaling by transmitting the radio frequency transmit signal on four or more antennas of the plurality of antennas.

8. The mobile device of claim 7 wherein the sounding reference signaling does not interrupt reception of an anchor carrier on the four or more antennas.

9. The mobile device of claim 8 wherein the radio frequency transmit signal is a fifth generation n41 signal and the anchor carrier is a long term evolution B25 signal.

10. The mobile device of claim 1 further comprising a transceiver configured to generate the radio frequency transmit signal.

11. A method of antenna switching in a mobile device, the method comprising:
receiving a radio frequency transmit signal at an input of a power amplifier;

providing the radio frequency transmit signal from an output of the power amplifier to a first amplifier selection switch, the power amplifier corresponding to a final amplifier in a transmit signal path to a plurality of antennas;

providing the radio frequency transmit signal from the first amplifier selection switch to a first antenna switch through a transmit band filter in a first mode, the transmit band filter directly connected between the first antenna switch and the first amplifier selection switch; and providing the radio frequency transmit signal from the first amplifier selection switch to a second antenna switch through a second amplifier selection switch and a receive band filter in a second mode, the receive band filter directly connected between the second antenna switch and the second amplifier selection switch.

12. The method of claim 11 further comprising providing the radio frequency transmit signal to a first antenna and a second antenna of the plurality of antennas through the first amplifier selection switch and the first antenna switch.

13. The method of claim 12 further comprising providing the radio frequency transmit signal to a third antenna and a fourth antenna of the plurality of antennas through the first amplifier selection switch, the second amplifier selection switch, and the second antenna switch.

14. A front-end system comprising:

a power amplifier configured to receive a radio frequency transmit signal at an input, the power amplifier corresponding to a final amplifier in a transmit signal path to a plurality of antennas;

a first amplifier selection switch connected to an output of the power amplifier, and a second amplifier selection switch connected to the first amplifier selection switch;

a first antenna switch and a second antenna switch;

a transmit band filter directly connected between the first antenna switch and the first amplifier selection switch; and a receive band filter directly connected between the second antenna switch and the second amplifier selection switch.

15. The front-end system of claim 14 wherein the radio frequency transmit signal is provided to a first antenna and a second antenna of the plurality of antennas through the first amplifier selection switch and the first antenna switch.

16. The front-end system of claim 15 wherein the radio frequency transmit signal is provided to a third antenna and a fourth antenna of the plurality of antennas through the first amplifier selection switch, the second amplifier selection switch, and the second antenna switch.

17. The front-end system of claim 16 wherein the first antenna switch and the second antenna switch are each a cross-bar switch.

18. The front-end system of claim 14 further comprising a low noise amplifier connected to the receive filter through the second amplifier selection switch.

19. The front-end system of claim 14 wherein the front-end system is configured to provide sounding reference signaling by transmitting the radio frequency transmit signal on four or more antennas of the plurality of antennas.

20. The front-end system of claim 19 wherein the sounding reference signaling does not interrupt reception of an anchor carrier on the four or more antennas.

* * * * *